United States Patent [19]

Kuroda

[11] Patent Number: 5,799,274
[45] Date of Patent: Aug. 25, 1998

[54] SPEECH RECOGNITION SYSTEM AND METHOD FOR PROPERLY RECOGNIZING A COMPOUND WORD COMPOSED OF A PLURALITY OF WORDS

[75] Inventor: Masaru Kuroda, Yokohama, Japan

[73] Assignee: Ricoh Company, Ltd., Tokyo, Japan

[21] Appl. No.: 715,108

[22] Filed: Sep. 18, 1996

[30] Foreign Application Priority Data

Oct. 9, 1995 [JP] Japan ................... 7-261524
Mar. 7, 1996 [JP] Japan ................... 8-050008

[51] Int. Cl.$^6$ .................................. G10L 9/100
[52] U.S. Cl. .................................. 704/239; 704/255
[58] Field of Search ................... 704/253, 254, 704/252, 238, 239, 241, 243, 251, 255, 231, 232, 10

[56] References Cited

U.S. PATENT DOCUMENTS

| | | | |
|---|---|---|---|
| 4,592,086 | 5/1986 | Watari et al. | 704/238 |
| 4,831,653 | 5/1989 | Katayama | 704/235 |
| 4,955,056 | 9/1990 | Stentiford | 704/239 |
| 5,023,911 | 6/1991 | Gerson | 704/253 |
| 5,062,137 | 10/1991 | Watanabe et al. | 704/239 |
| 5,164,990 | 11/1992 | Pazienti et al. | 704/253 |
| 5,191,635 | 3/1993 | Fujimoto | 704/200 |
| 5,315,689 | 5/1994 | Kanazawa et al. | 704/238 |
| 5,526,466 | 6/1996 | Takizawa | 704/253 |
| 5,634,083 | 5/1997 | Oerder | 704/253 |
| 5,704,005 | 12/1997 | Iwamida | 704/251 |

FOREIGN PATENT DOCUMENTS

| | | | |
|---|---|---|---|
| 59-119397 | 7/1984 | Japan | G10L 1/00 |
| 5127696 | 5/1993 | Japan | G10L 5/06 |
| 643895 | 2/1994 | Japan | G01L 3/00 |

*Primary Examiner*—Richemond Dorvil
*Attorney, Agent, or Firm*—Cooper & Dunham LLP

[57] ABSTRACT

A speech recognition system and method having an increased recognition accuracy for a compound word composed of a first word and a second word. Standard information corresponding to each of the registered words is stored. The standard information includes predetermined feature information and time information with respect to each of the registered words. The time information represents a continuous time length for pronouncing each of the registered words at a normal speed. Feature information extracted from an input word is compared with the standard information to obtain a similarity between the feature information and the standard information corresponding to one of the registered words. A determination time is set to determine a result of recognition when the compound word is input and when a first degree of similarity is obtained from the first word at a first time and a maximum degree of similarity is obtained from one of the second word and the compound word at a second time. The determination time is set to a time prior to the second time, by the continuous time length which corresponds to the one of the second word and the compound word having the maximum degree of similarity.

25 Claims, 6 Drawing Sheets

F I G. 1
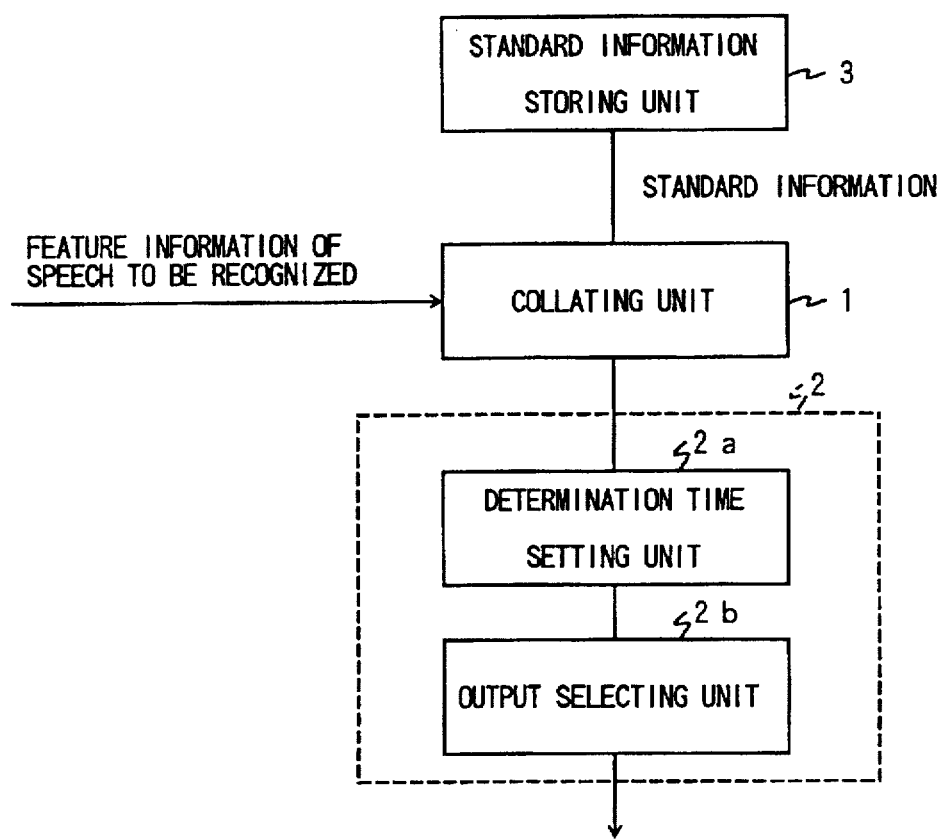

F I G. 3
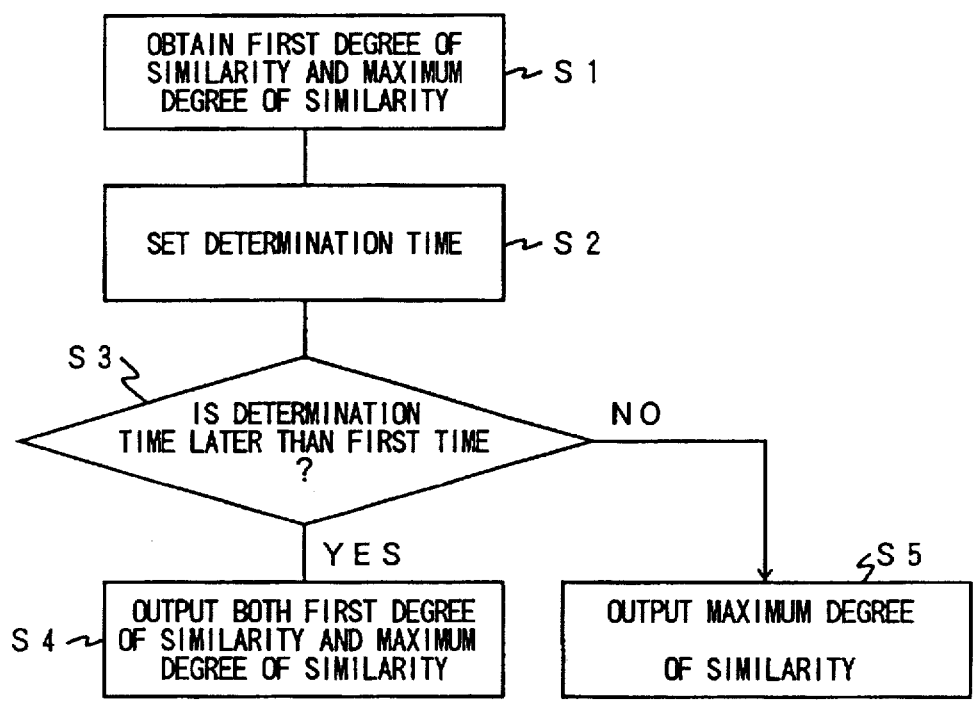

SPEECH RECOGNITION SYSTEM AND METHOD FOR PROPERLY RECOGNIZING A COMPOUND WORD COMPOSED OF A PLURALITY OF WORDS

BACKGROUND OF THE INVENTION

1. Field of the Invention

The present invention generally relates to a speech recognition system and method and, more particularly, to a speech recognition and method using a word spotting method. Further, the present invention relates to a speech recognition system and method for properly recognizing a compound word which is composed of a first word and a second word when the first and second words are pronounced continuously, the meaning of the compound word being different from the meaning of one of the first and second words.

2. Description of the Related Art

In a conventional speech recognition system, a start point and an end point of a voice detection is determined by using information with respect to the power or strength of a voice. The recognition process is performed based on information with respect to the voice detection. In such a system, a start point of a voice detection can be easily found. However, it is not easy to find an end point due to the problem that it is difficult to distinguish, for example, a silent period corresponding to a plosive consonant from a silent period (a discrete time or an isolation time) between adjacent voice parts or words.

In order to solve the above-mentioned problem, Japanese Laid-Open Patent Application No.59-119397 discloses a system in which an end point of a voice detection is recognized when a silent period lasts more than a predetermined period of time. Additionally, as a method for improving the segmentation of a voice part or a word, Japanese Laid-Open Patent Application No.5-127696 discloses a method in which a second comparison is performed after a first comparison is performed. That is, in the first comparison, the segmentation is performed and a degree of similarity is produced. In the second comparison, the segmentation and the similarity obtained by the first comparison are compared with standard patterns so as to improve recognition accuracy. Further, Japanese Laid-Open Patent Application No.6-43895 discloses a method which does not require a waiting time of more than a predetermined period of time to detect the end point of the voice detection. In this method, it is determined whether or not an end point of the voice detection is accurate by comparing a similarity of the voice part defined by the end of the voice detection with a threshold value of the similarity.

According to the invention disclosed in the above-mentioned Japanese Laid-Open Patent Application No.59-119397, the discrete time normally lasts about 250–350 ms. In this method, since a plosive consonant (a geminative consonant) is treated, a predetermined period is required to determine whether or not a given silent period is the true silent period (a discrete time between pronunciations) or a silent period corresponding to a plosive consonant. Thus, this system cannot output the result of recognition until the predetermined time period has elapsed. Accordingly, the result of recognition cannot be obtained immediately after the end of each pronunciation, resulting in a speech recognition system having a slow response. If the discrete time is shortened to obtain a quick response time, the system may erroneously pick up a geminative consonant as the discrete time. This creates a problem in that an incorrect result of recognition is output.

Additionally, a speaker sometimes pronounces unnecessary words such as "Ah" or "Well" which are irrelevant to the speech to be recognized. In such a case, since the start point of the voice detection is determined when the word "Ah" or "Well" is pronounced, a degree of recognition is deceased, resulting in an erroneous recognition.

In order to eliminate such a problem, the word spotting method has been suggested. In the word spotting method, a quick response time is achieved since the detection of speech segments is not required. Additionally, the above-mentioned unnecessary words can be eliminated from the words included in a speech.

However, the word spotting method has the following problem when a word to be recognized contains a different word in a dictionary in which words are registered to perform a recognition process. An example of the word having such a relationship is the word "Carmel" which contains the word "car" therein. When the word "Carmel" is pronounced, a degree of similarity with respect to "car" is increased when the pronunciation proceeds to "car", and a degree of similarity is also increased when the rest of the word "mel" is pronounced. However, since the part corresponding to "mel" is not a silent period but a voice part, a silent period is not output as disclosed in the above-mentioned Japanese Laid-Open Patent Application No.59-119397. Additionally, since the pronunciation of "mel" lasts about 0.1 to 0.2 seconds, the result of recognition corresponding to "Carmel" is output immediately after the result of recognition corresponding to "car". Thus, the speaker cannot recognize as to which word was recognized, "car" or "Carmel". If the degree of similarity of "Carmel" is greater than the degree of similarity of "car", a post processing may be applied to output the correct result since the correct result "Carmel" is output after the result corresponding to "car" is output. However, if the degree of similarity of "car" is greater than the degree of similarity of "Carmel", it is difficult to determine whether "mel" is an unnecessary word or "Carmel" is the correct word to be recognized.

SUMMARY OF THE INVENTION

It is a general object of the present invention to provide an improved and useful speech recognition system and method in which the above-mentioned problems are eliminated.

A more specific object of the present invention is to provide a speech recognition system and method having an increased recognition accuracy in the word spotting method.

Another object of the present invention is to provide a speech recognition system and method which can provide an appropriate recognition result for a compound word composed of a plurality of words.

In order to achieve the above-mentioned objects, there is provided according to one aspect of the present invention a speech recognition system for recognizing a word contained in a speech by obtaining a similarity between the word and one of registered words registered in the speech recognition system, the speech recognition system comprising:

standard information storing means for storing standard information corresponding to each of the registered words, the registered words including a compound word composed of a first word and a second word pronounced in that order, the standard information including predetermined feature information and time information with respect to each of the registered words, the time information representing a continuous time length for pronouncing each of the registered words at a normal speed;

collating means for collating feature information extracted from a word to be recognized with the standard information so as to obtain a similarity between the feature information and the standard information corresponding to one of the registered words; and determination time setting means for setting a determination time to determine a result of recognition when the compound word is input for recognition and when a first degree of similarity is obtained from the first word at a first time and a maximum degree of similarity is obtained from one of the second word and the compound word at a second time, the determination time being set to a time prior to the second time, by the continuous time length which corresponds to the one of the second word and the compound word having the maximum degree of similarity.

According to the above-mentioned invention, since the first time corresponding to the first word is compared with the second time corresponding to the second word or the compound word with respect to passage of time, the compound word can be discriminated by using the word spotting method with a high recognition accuracy. Additionally, if the first word or the second word is a meaningless word, such word can be eliminated from the output of the result of recognition. Further, by providing a threshold value with respect to the degree of similarity or changing a time to output the result of recognition, the recognition accuracy for the compound word can be increased for many types of compound word.

The speech recognition system according to the present invention may further comprise output selecting means for selecting at least one of the first word and the compound word in accordance with a comparison of the determination time with the first time with respect to passage of time.

In one embodiment according to the present embodiment, the first word may be selected and the one of the second word and the compound word may also be selected when the determination time is later than the first time.

Additionally, the determination time may be set based on a time period obtained by a multiplication of a predetermined factor and the continuous time length. The multiplication factor may have a value in a range from 0.7 to 1.3.

In one embodiment according to the present invention, the output selecting means may set a threshold value with respect to the continuous time length so that the output selecting means outputs both of the first word and one of the second word and the compound word when the continuous time length corresponding to the one of the second word and the compound word is shorter than the threshold value.

Additionally, the output selecting means may output the result of recognition at a time when an isolation time period and an additional time period have passed after the first time when the first word has a first meaning and the compound word has a second meaning different from the first meaning and when the second time is later than a time when the isolation time period has passed after the first time.

The additional time period may be determined for each compound word in accordance with a length of the second word. When there is a plurality of registered compound words, each of which has the same first word, the additional time period corresponding to a compound word having the longest second word may be used for each of the compound words.

Further, in one embodiment according to the present invention, the output selecting means may output the result of recognition at a time when an isolation time period has passed after the second time when the first word has a first meaning and the compound word has a second meaning different from the first meaning and when the second time is later than a time when the isolation time period has passed after the first time.

Additionally, the output selecting means may output both of the compound word and the second word when the second time is substantially equal to the first time and when both of the first degree of similarity and the maximum degree of similarity exceed a first threshold value by ignoring a determination process according to the determination time.

The output selecting means outputs one of the compound word and the second word which exceeds a second threshold value higher than the first threshold value.

Additionally, there is provided according to another aspect of the present invention a speech recognition method for recognizing a word contained in a speech by obtaining a similarity between the word and one of registered words registered in a speech recognition system, the speech recognition system comprising standard information storing means for storing standard information corresponding to each of the registered words, the registered words including a compound word composed of a first word and a second word pronounced in that order, the standard information including predetermined feature information and time information with respect to each of the registered words, the time information representing a continuous time length for pronouncing each of the registered words at a normal speed, the speech recognition method comprising the steps of;

a) collating feature information extracted from a word to be recognized with the standard information so as to obtain a similarity between the feature information and the standard information corresponding to one of the registered words;

b) setting a determination time to determine a result of recognition when the compound word is input for recognition and when a first degree of similarity is obtained from the first word at a first time and a maximum degree of similarity is obtained from one of the second word and the compound word at a second time, the determination time being set to a time prior to the second time, by the continuous time length which corresponds to the one of the second word and the compound word having the maximum degree of similarity; and c) outputting at least one of the first word and the compound word in accordance with a comparison of the determination time with the first time with respect to passage of time.

According to this invention, since the first time corresponding to the first word is compared with the second time corresponding to the second word or the compound word with respect to passage of time, the compound word can be discriminated by using the word spotting method with high recognition accuracy. Additional, if the first word or the second word is a meaningless word, such word can be eliminated from the output of the result of recognition. Further, by providing a threshold value with respect to the degree of similarity or changing a time to output the result of recognition, the recognition accuracy for the compound word can be increased for many types of compound words.

Other objects, features and advantages of the present invention will become more apparent from the following details description when read in conjunction with the accompanying drawings.

BRIEF DESCRIPTION OF THE DRAWINGS

FIG. 1 is a block diagram of a speech recognition system according to a first embodiment of the present invention;

FIG. 3 is a flowchart of an operation performed in the speech recognition system shown in FIG.1;

DETAILED DESCRIPTION OF THE PREFERRED EMBODIMENTS

A description will now be given of a speech recognition system according to a first embodiment of the present invention. FIG. 1 is a block diagram of the speech recognition system according to the first embodiment of the present invention. It should be noted that a speech recognition method according to the present invention is performed in the speech recognition system shown in FIG. 1.

As shown in FIG. 1, the speech recognition system comprises collating unit 1, output unit 2 and a standard information storing unit 3. The standard information storing unit 3 stores various sets of standard information such as feature pattern information used for recognizing the speech to be recognized which is input to the speech recognition system. Each set of standard information is provided with time information which is a characteristic feature of the speech recognition system according to the first embodiment of the present invention. The time information is referred to as a continuous time length. The continuous time length is obtained by multiplying a predetermined rate to a time corresponding to a speech segment of each word. For example, if the speech segment of the word "left-hand" is 1 second, the continuous time length of the word "left-hand" is set to 0.9 seconds which is a product of 1 second times 0.9 which is near 1. Here, the factor 0.9 corresponds to the predetermined rate. The continuous time length is provided to each word in the standard information storing unit 3.

Figure 2:
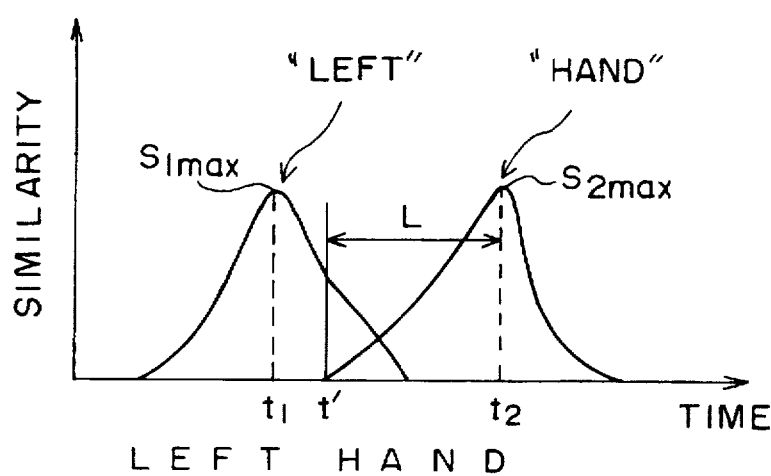
FIG. 2 is a graph showing a variation in a degree of similarity obtained from a compound word "left-hand"

Similar to the conventional system, feature information and the standard information are supplied to the collating means 1. The feature information is extracted from speech to be recognized. The collating unit 1 compares sets of feature information with the standard information one after another, and sequentially supplies information with respect to a result of the comparison, that is, a similarity of each set of information to the output unit 2. If the speech to be recognized is "left-hand", the pronunciations corresponding to "le", "f", "t", "ha", "n" and "d", respectively, are sequentially compared with the standard information. Similarity obtained by each comparison is supplied to the output unit 2 together with time information which indicates the time when the similarity was obtained. When the complete word "left" is pronounced, a peak is formed in the degree of similarity as shown in FIG. 2. At this time, the collating unit 1 supplies to the output unit 2 the degree of similarity at the top of the peak, the time when the similarity corresponding to the top of the peak was obtained and the continuous time length provided to the word "left". Thereafter, syllables "ha", "n" and "d" are continuously pronounced. Since there is no independent word in the standard information which corresponds to each of the syllables "ha", "n" and "d", the degree of similarity is decreased. However, when the complete word "hand" has been pronounced, another peak (a second peak) is formed in the degree of similarity since there is a word corresponding to the pronunciation of "hand" in the standard information. At this time, the collating unit 1 also supplies to the output unit 2 the degree of similarity at the top of the second peak, the time when the similarity corresponding to the top of the second peak was obtained and the continuous time length provided to the word "hand".

In the case above in which two words are joined to make a single combination, hereinafter the word "left" is referred to as a first word, and the word "hand", which is continuously pronounced after the pronunciation of the first word, is referred to as a second word. Additionally, the degree of similarity, which is a maximum among the degrees of similarity obtained from the pronunciation of the first and second words, is referred to as a maximum degree of similarity. A degree of similarity less than the maximum degree of similarity is referred to as a first degree of similarity. The time when the first similarity is obtained is referred to as a first time. The time when the maximum degree of similarity is obtained is referred to as a second time. It should be noted that the first degree of similarity is normally obtained from the first word.

Additionally, the collating unit 1 processes a word such as, for example, "Carmel" in which "car" corresponds to the above-mentioned first word and "mel" corresponds to the second word, as described later. In this case, the first word "car" has a definite meaning, and the second word "mel" has no meaning, but the compound word "Carmel" has a meaning different from the meaning of the first word.

When an input speech to be recognized is a compound word, it is determined whether the compound word corresponds to the "left-hand" type or the "Carmel" type. The determination is made based on classification information provided to the standard information corresponding to the compound word.

The output unit 2 comprises a determination time setting unit 2a and an output selecting unit 2b as shown in FIG.1. The determination time setting unit 2a sets a determination time which is the time of a second continuous time length before the second time. The second time is the time when the maximum degree of similarity is obtained from the second word or the entire compound word. The second continuous time length is the continuous time length provided to the second word.

The output selecting unit 2b determines which has occurred earlier, the determination time or the first time. If the determination time has occurred after the first time, the output selecting unit 2b outputs both the first degree of similarity and the maximum degree of similarity. If the determination time has occurred before the first time, the output selecting unit 2b outputs only the first degree of similarity, for example.

A description will now be given, with reference to FIG. 3, of a case where a word is input to the speech recognition system shown in FIG. 1. FIG. 3 is a flowchart of an operation performed in the speech recognition system shown in FIG. 1. It is assumed that the standard information storing unit 3 stores a feature pattern $Y_{1i}$ and a continuous time length $L_1$ of the first word and a feature pattern $Y_{2i}$ and a continuous time length $L_2$ of the second word.

In a case where the first word is "left" and the second word is "hand" and when the input pronunciation is "left-hand", the degree of similarity varies with respect to passage of time as shown in FIG. 2. That is, a degree $S_1$ of similarity obtained by a collation with the first word "left" is at a maximum at the time $t_1$. A degree $S_2$ of similarity obtained by a collation with the second word "hand" is at a maximum at the time $t_2$. In FIG. 2, the top of the peak of the degree $S_1$ of similarity is indicated by $S_{1max}$, and the top of the peak of the degree $S_2$ of similarity is indicated by $S_{2max}$. The collation for the first and second words corresponds to step S1 of the flowchart of FIG.3.

As mentioned above, if $S_{1max}$ is equal to or greater than $S_{2max}$, the second maximum degree $S_{2max}$ is output after the first maximum degree $S_{1max}$ is output. Thus, there is no problem in such a case. However, if $S_{1max}$ is less than $S_{2max}$, there may be a problem in that the pronunciation corresponding to the first word is determined as a result of an erroneous recognition. This is because the second maximum degree $S_{2max}$ of similarity corresponding to the second word is obtained in a very short time after the first maximum degree $S_{1max}$ is obtained, and thus the pronunciation of the first word is regarded as an erroneous input or an erroneous recognition. In this case, the result of recognition with respect to the first word may be disregarded and no output will be made for the first word.

In order to eliminate the above-mentioned problem, the speech recognition system according to the present invention operates as described below.

That is, as shown in step S2 of FIG.3, a determination time t' is set first. The determination time t' is a time which corresponds to a second continuous time length $L_2$ before the time $t_2$ when the second maximum degree $S_{2max}$ of similarity is obtained. In this case, the second maximum degree $S_{2max}$ of similarity corresponds to the aforementioned maximum degree of similarity, and the first maximum degree $S_{1max}$ of similarity corresponds to the aforementioned first degree of similarity. The determination time t' is considered to be a starting point of a pronunciation of the second word. If the determination time t' is after the first time $t_1$ as shown in FIG. 2, the first maximum degree $S_{1max}$ of similarity is a result of a recognition from a word different from the second word which has the second maximum degree $S_{2max}$. On the contrary, if the determination time t' is before the first time $t_1$, the first word having the first maximum degree $S_{1max}$ can be regarded as an unnecessary word which should be contained in the pronunciation of the second word.

Based on the above-mentioned concept, the speech recognition system according to the present invention outputs both the first and second maximum degree $S_{1max}$ and $S_{2max}$ when the first maximum degree $S_{1max}$ is obtained before the determination time t'. On the other hand, the speech recognition system according to the present invention outputs only the second maximum degree $S_{2max}$ of similarity when the first maximum degree $S_{1max}$ is not obtained before the determination time t'.

Pronunciation speed is generally varies from speaker to speaker, and thus the variation in the pronunciation speed must be considered when the determination time t' set based on the continuous time length $L_2$. In many experiences, a range of the variation in the pronunciation speed is ±30% of a normal speed. That is, the time period for pronunciation may be varied from 0.7 to 1.3 times of a time period of a normal speed. Accordingly, in the present embodiment, the determination time t' is set to a time within 70% to 130% (±30%) of the second continuous time length $L_2$.

With respect to a relatively short word such as "hand", since the continuous time length is also short, it is difficult to reflect the variation in pronunciation speed. In order to eliminate this problem, the speech recognition system according to the present invention sets a threshold value $L_{th}$ for the continuous time length L. If the continuous time length L of a recognized word is shorter than the threshold value $L_{th}$, both the first maximum degree $S_{1max}$ and the second maximum degree $S_{2max}$ are output.

Accordingly, in the speech recognition system according to the present invention, the compound word, in which two words are pronounced continuously, can be properly processed by the word spotting method, and each word can be distinguished from unnecessary words.

Figure 4:
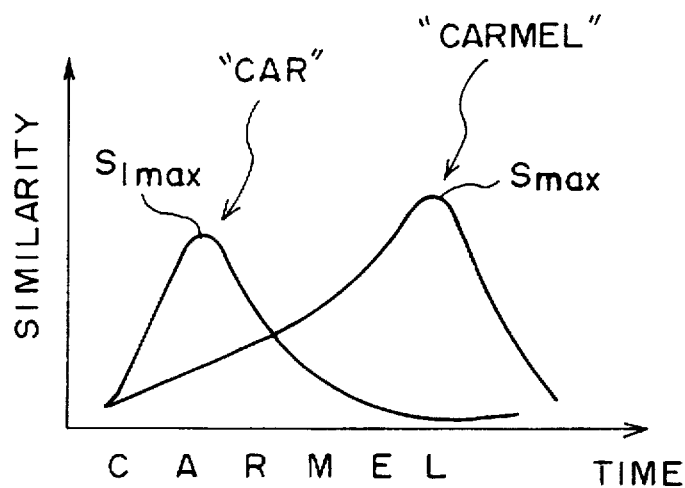
FIG. 4 is a graph showing a variation in a degree of similarity obtained from a compound word "Carmel"
Figure 5:
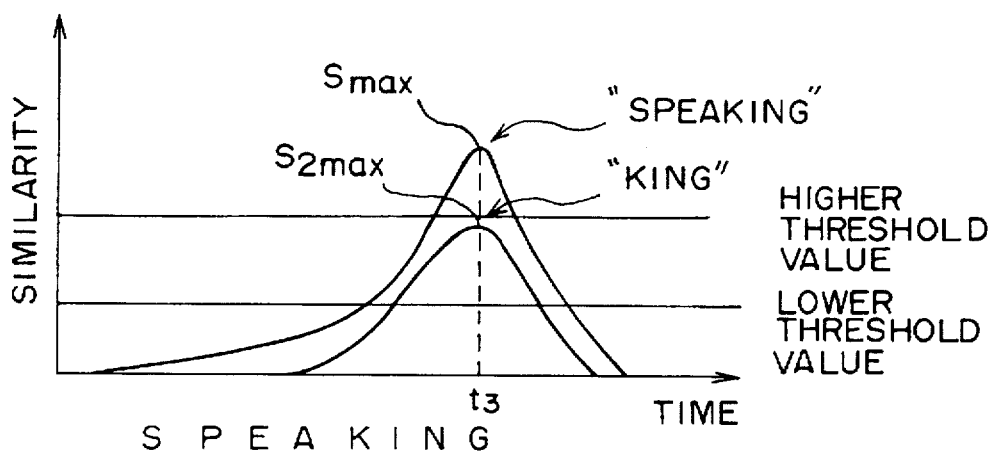
FIG. 5 is a graph showing a variation in a degree of similarity obtained from a compound word "speaking"

Now, a description will be given of a different example of the compound word such as "speaking" in which "speak" corresponds to the first word and "king" corresponds to the second word. In the previously described example "Carmel", the first maximum degree $S_{1max}$ corresponding to the first word "car" is obtained at a different time from the time when the maximum degree $S_{max}$ of similarity corresponding to the entire compound word "Carmel" as shown in FIG.4 was obtained. However, in the example "speaking", the maximum degree $S_{max}$ of similarity corresponding to the entire compound word "speaking" and the second maximum degree $S_{2max}$ of similarity corresponding to the second word "king" are obtained almost at the same time $t_3$ as shown in FIG.5. In this case, either one of the words may be chosen as the correct word to be recognized. Alternatively, both words may be chosen as the correct words to be recognized.

Figure 6:
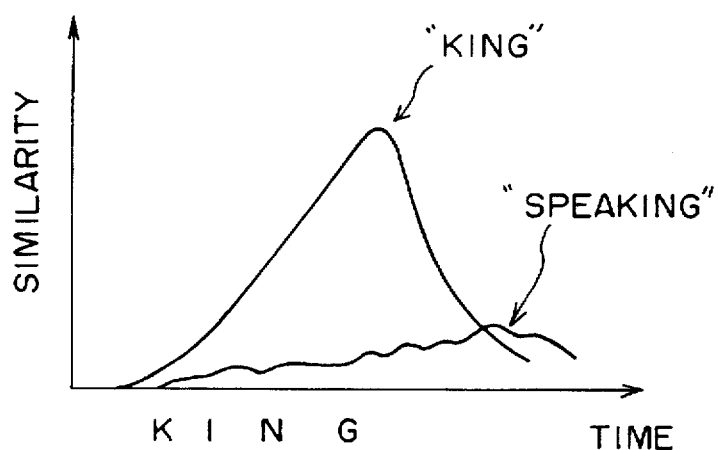
FIG. 6 is a graph showing a variation in a degree of similarity obtained from a single word "king"
Figure 7:
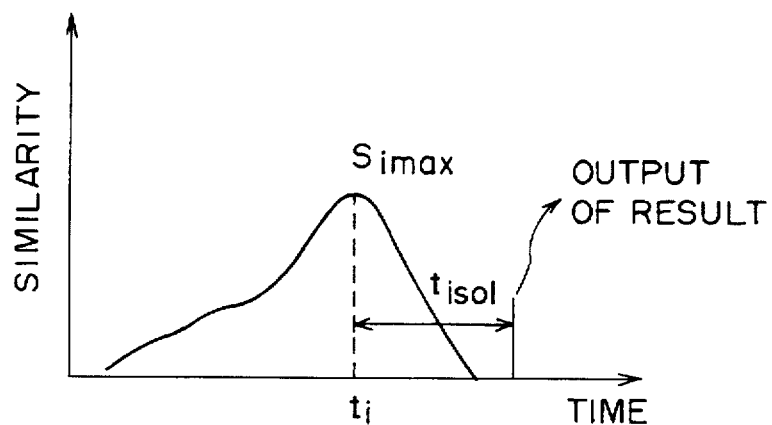
FIG. 7 is a graph showing a variation in a degree of similarity for explaining a method to determine a time to output a result of recognition.

In the present embodiment, one of the words is chosen by providing a lower threshold value and a higher threshold value. That is, if both the maximum degree $S_{max}$ corresponding to the compound word and the first degree $S_{2max}$ exceed the lower threshold value, and if one of the maximum degree $S_{max}$ and the first degree $S_{2max}$ exceeds the higher threshold value, the word corresponding to the one of the maximum degree $S_{max}$ and the first degree $S_{2max}$ which exceeds the higher threshold value is chosen as the result of recognition. In other words, the word corresponding to the one of the maximum degree $S_{max}$ and the first degree $S_{2max}$ which does not exceed the higher threshold value is not output. The reason for this is that when the word "king" is pronounced, the degree of similarity obtained by collating with the standard information corresponding to the word "speaking" is not sufficiently increased as shown in FIG.6. On the other hand, when the word "speaking" is pronounced, both similarities corresponding to the words "speaking" and "king" are increased as shown in FIG.5. Thus, in the present embodiment, the lower and higher threshold values are provided to eliminate one of the words which is considered to be an unnecessary word.

If only the lower threshold value is set in the above-mentioned method, both words "speaking" and "king" are output as the result of recognition. In such a case, a user may chose one of the methods, one method being to chose one of the words by an application software of the speech recognition system and another method being to chose both words. Additionally, this method can be used when the standard information corresponding to the word "speaking" is not properly prepared. This may happen in a case where the word "speaking" is pronounced in a different way when preparing the standard information, or in a case where a noise enters when the standard information is prepared. In this case, the word "speaking" can be recognized by using two words "speak" and "king". That is, if the standard information includes information corresponding to the word "speak" and "king", the word "speaking" can be recognized by combining the results of recognition since both similarities corresponding to the words "speak" and "king" are output when the word "speaking"is pronounced.

Generally, the result of recognition is output after a waiting time of about 250–350 ms. This is to discriminate the end of the voice detection from the silent part in the plosive consonant as described before. However, the start point and end point of each voice detection are not necessarily detected because the voice detection is not performed in the word spotting method. Accordingly, in the conventional method, there is a technique in which a time $t_i$, when the maximum degree $S_{imax}$ is obtained, is determined as the end point of a pronunciation, and a result is output after an isolation time period $t_{isol}$ (250–350 ms) has passed. The isolation time period $t_{isol}$ is a normal time period between adjacent speech segments.

Figure 8:
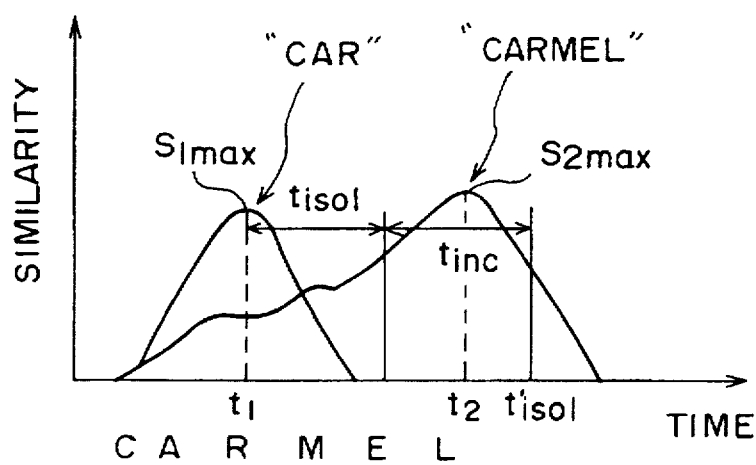
FIG. 8 is a graph showing a variation in a degree of similarity obtained from a compound word "Carmel" to explain a method to determine a time to output a result of recognition in the first embodiment of the present invention.

In the speech recognition system according to the present invention, the following operation is performed when the compound word "Carmel" is recognized. Referring to FIG. 8, at a time $t_1$ when the pronunciation proceeds to "car", the degree $S_{1max}$ of similarity corresponding to the first word "car" becomes maximum. In the conventional method, the result of recognition is output at a time $(t1+t_{isol})$. However, in the present embodiment, an additional time period $t_{inc}$ is provided, and the result is output at a time $t'_{isol}$ which is a sum $(t_1+t_{isol}+t_{inc})$. This time setting is provided to delay the output of the result since the word "car" is contained in the compound word "Carmel". Thus, the result of recognition is output by comparing the degree $S_{max}$ of similarity corresponding to the compound word "Carmel" with the degree $S_{1max}$ of similarity corresponding to the first word "car" when the entire word "Carmel" has been pronounced. In the example shown in FIG. 8, since the degree of similarity corresponding to the word "Carmel" is greater than the degree of similarity corresponding to the word "car", the word "Carmel" is output as the result of recognition. Accordingly, the speech recognition system according to the present embodiment can eliminate an output of the unnecessary word "car" whereas the conventional system outputs both words "car" and "Carmel". It should be noted that the above-mentioned additional time period is previously determined to be an appropriate time period, for example, 200 ms, for each compound word.

When a plurality of compound words are present with respect to a first word, the maximum time period among additional time periods corresponding to those compound words is selected. For example, if the compound word "cardinal" is included in the standard information other than the word "Carmel" containing the word "car" as the first word, the second word of the word "cardinal" is "dinal". The word "dinal" is longer than the word "mel" which is the second word contained in the word "Carmel". Thus, the additional time period $t_{inc}$ provided to the first word "car" is determined as a time period corresponding to the word "dinal".

Figure 9:
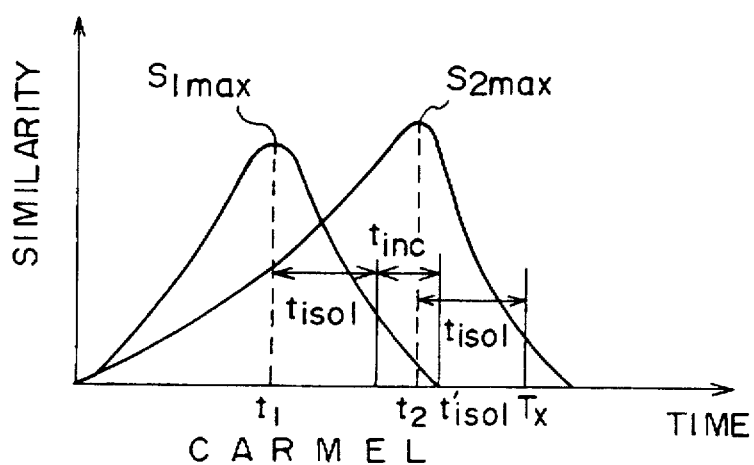
FIG. 9 is a graph showing a variation in a degree of similarity obtained from a compound word "Carmel" to explain another method to determine a time to output a result of recognition in the first embodiment of the present invention.

In the above-mentioned embodiment, it is determined to output one of the words "car" and "Carmel" as a result of recognition at the time $t'_{isol}$. However, the determination may only be made at the time $t'_{isol}$. That is, when the pronunciation of the word "Carmel" is input, it is determined at the time $t'_{isol}$ whether or not a degree of similarity greater than the degree $S_{1max}$ of similarity corresponding to the first word "car" is obtained between the time $t_1$ and the time $t'_{isol}$. If only the degree $S_{1max}$ is obtained during the time period from the time $t_1$ to the time $t'_{isol}$, the word "car" is output as the result of recognition. On the other hand, as shown in the example of FIG. 9, the degree $S_{2max}$ of similarity corresponding to the word "Carmel" is obtained at the time $t_2$ during the time period from the time $t_1$ to the time $t'_{isol}$. Thus, it is determined as to which degree of similarity is greater, the degree $s_{1max}$ or the degree $S_{2max}$. In the example shown in FIG. 9, since the degree $S_{2max}$ of similarity is greatest among the degree of similarities obtained during the time period from the time $t_1$ to the time $t'_{isol}$, the word "Carmel" is output as the result of recognition at a time $T_x$. The time $t_x$ is obtained by further adding the isolation time period $t_{isol}$ to the time $t_2$.

According to the above-mentioned operation, the word "Carmel" has a degree of similarity greater than the degree of similarity of the word "car". In this case, is can be said that the word "car" is determined as a part of the word "Carmel". This is convenient for the user in that the word "Carmel" is output solely without the word "car" when the user pronounces the word "Carmel".

It should be noted that, in the above-mentioned embodiment, although the compound word is composed off two words, the present invention is applicable to a compound word composed of more than two words.

The present invention is not limited to the specifically disclosed embodiments, and variations and modifications may be made without departing from the scope of the present invention.

What is claimed is:

1. A speech recognition system for recognizing a word contained in a speech by obtaining a similarity between the word and one of registered words registered in said speech recognition system, said speech recognition system comprising:

standard information storing means for storing standard information corresponding to each of said registered words, said registered words including a compound word composed of a first word and a second word pronounced in an order of the first word and then the second word, said standard information including predetermined feature information and time information with respect to each of said registered words, said time information representing a continuous time length for pronouncing each of said registered words at a normal speed;

collating means for collating feature information extracted from the word to be recognized with the standard information so as to obtain a similarity between the feature information and the standard information corresponding to one of said registered words; and determination time setting means for setting a determination time to determine a result of recognition when the compound word is inputted for recognition and when a first degree of similarity is obtained from the first word at a first time and a maximum degree of similarity is obtained from one of the second word and the compound word at a second time, said determination time being set to a time prior to said second time, by the continuous time length which corresponds to the one of the second word and the compound word having said maximum degree of similarity.

2. The speech recognition system as claimed in claim 1, further comprising output selecting means for selecting at least one of said first word and said compound word in accordance with a comparison of said determination time with said first time with respect to passage of time.

3. The speech recognition system as claimed in claim 2, wherein said first word is selected and said one of said second word and said compound word is also selected when said determination time is later than said first time.

4. The speech recognition system as claimed in claim 2, wherein said determination time is set based on a time period obtained by a multiplication of a predetermined factor and the continuous time length.

5. The speech recognition system as claimed in claim 4, wherein said multiplication factor has a value in a range of from 0.7 to 1.3.

6. The speech recognition system as claimed in claim 2, wherein said output selecting means sets a threshold value with respect to the continuous time length so that said output selecting means outputs both of said first word and one of said second word and said compound word when the continuous time length corresponding to the one of said second word and said compound word is shorter than said threshold value.

7. The speech recognition system as claimed in claim 2, wherein said output selecting means outputs the result of recognition at a time when an isolation time period and an additional time period have passed after said first time when said first word has a first meaning and said compound word has a second meaning different from said first meaning and when said second time is later than a time when the isolation time period has passed after said first time.

8. The speech recognition system as claimed in claim 7, wherein said additional time period is determined for each compound word in accordance with a length of said second word.

9. The speech recognition system as claimed in claim 8, wherein when there is a plurality of registered compound words, each of which has the same first word, the additional time period corresponding to a compound word having the longest second word is used for each of said compound words.

10. The speech recognition system as claimed in claim 2, wherein said output selecting means outputs the result of recognition at a time when an isolation time period has passed after said second time when said first word has a first meaning and said compound word has a second meaning different from said first meaning and when said second time is later than a time when the isolation time period has passed after said first time.

11. The speech recognition system as claimed in claim 2, wherein said output selecting means outputs both of said compound word and said second word when said second time is substantially equal to said first time and when both of said first degree of similarity and said maximum degree of similarity exceed a first threshold value by ignoring a determination process according to said determination time.

12. The speech recognition system as claimed in claim 11, wherein said output selecting means outputs one of said compound word and said second word which exceeds a second threshold value higher than said first threshold value.

13. A speech recognition method for recognizing a word contained in a speech by obtaining a similarity between the word and one of registered words registered in a speech recognition system, said speech recognition system comprising standard information storing means for storing standard information corresponding to each of said registered words, said registered words including a compound word composed of a first word and a second word pronounced in an order of the first word and then the second word, said standard information including predetermined feature information and time information with respect to each of said registered words, said time information representing a continuous time length for pronouncing each of said registered words at a normal speed, said speech recognition method comprising the steps of;

a) collating feature information extracted from the word to be recognized with the standard information so as to obtain a similarity between the feature information and the standard information corresponding to one of said registered words;

b) setting a determination time to determine a result of recognition when the compound word is inputted for recognition and when a first degree of similarity is obtained from the first word at a first time and a maximum degree of similarity is obtained from one of the second word and the compound word at a second time, said determination time being set to a time prior to said second time, by the continuous time length which corresponds to the one of the second word and the compound word having said maximum degree of similarity; and c) outputting at least one of said first word and said compound word in accordance with a comparison of said determination time with said first time with respect to passage of time.

14. A speech recognition system for recognizing a word contained in a speech by obtaining a similarity between the word and one of registered words registered in said speech recognition system, said speech recognition system comprising:

standard information storing unit for storing standard information corresponding to each of said registered words, said registered words including a compound word composed of a first word and a second word pronounced in an order of the first word and then the second word, said standard information including predetermined feature information and time information with respect to each of said registered words, said time information representing a continuous time length for pronouncing each of said registered words at a normal speed;

a collating unit which compares feature information extracted from the word to be recognized with the standard information to obtain similarity information between the feature information and the standard information corresponding to one of said registered words; and a determination time setting unit receivng the similarity information from said collating unit and for setting a determination time to determine a result of recognition when the compound word is inputted for recognition and when a first degree of similarity is obtained from the first word at a first time and a maximum degree of similarity is obtained from one of the second word and the compound word at a second time, said determination time being set to a time prior to said second time, by the continuous time length which corresponds to the one of the second word and the compound word having said maximum degree of similarity.

15. The speech recognition system as claimed in claim 14, further comprising an output selecting unit for selecting at least one of said first word and said compound word in accordance with a comparison of said determination time with said first time with respect to passage of time.

16. The speech recognition system as claimed in claim 15, wherein said first word is selected and said one of said second word and said compound word is also selected when said determination time is later than said first time.

17. The speech recognition system as claimed in claim 15, wherein said determination time is set based on a time period obtained by a multiplication of a predetermined factor and the continuous time length.

18. The speech recognition system as claimed in claim 17, wherein said multiplication factor has a value in a range of from 0.7 to 1.3.

19. The speech recognition system as claimed in claim 15, wherein said output selecting unit sets a threshold value with respect to the continuous time length so that said output selecting unit outputs both of said first word and one of said second word and said compound word when the continuous time length corresponding to the one of said second word and said compound word is shorter than said threshold value.

20. The speech recognition system as claimed in claim 15, wherein said output selecting unit outputs the result of recognition at a time when an isolation time period and an additional time period have passed after said first time when said first word has a first meaning and said compound word has a second meaning different from said first meaning and when said second time is later than a time when the isolation time period has passed after said first time.

21. The speech recognition system as claimed in claim 20, wherein said additional time period is determined for each compound word in accordance with a length of said second word.

22. The speech recognition system as claimed in claim 21, wherein when there is a plurality of registered compound words, each of which has the same first word, the additional time period corresponding to a compound word having the longest second word is used for each of said compound words.

23. The speech recognition system as claimed in claim 15, wherein said output selecting unit outputs the result of recognition at a time when an isolation time period has passed after said second time when said first word has a first meaning and said compound word has a second meaning different from said first meaning and when said second time is later than a time when the isolation time period has passed after said first time.

24. The speech recognition system as claimed in claim 15, wherein said output selecting unit outputs both of said compound word and said second word when said second time is substantially equal to said first time and when both of said first degree of similarity and said maximum degree of similarity exceed a first threshold value by ignoring a determination process according to said determination time.

25. The speech recognition system as claimed in claim 24, wherein said output selecting unit outputs one of said compound word and said second word which exceeds a second threshold value higher than said first threshold value.

* * * * *